Figure 1:
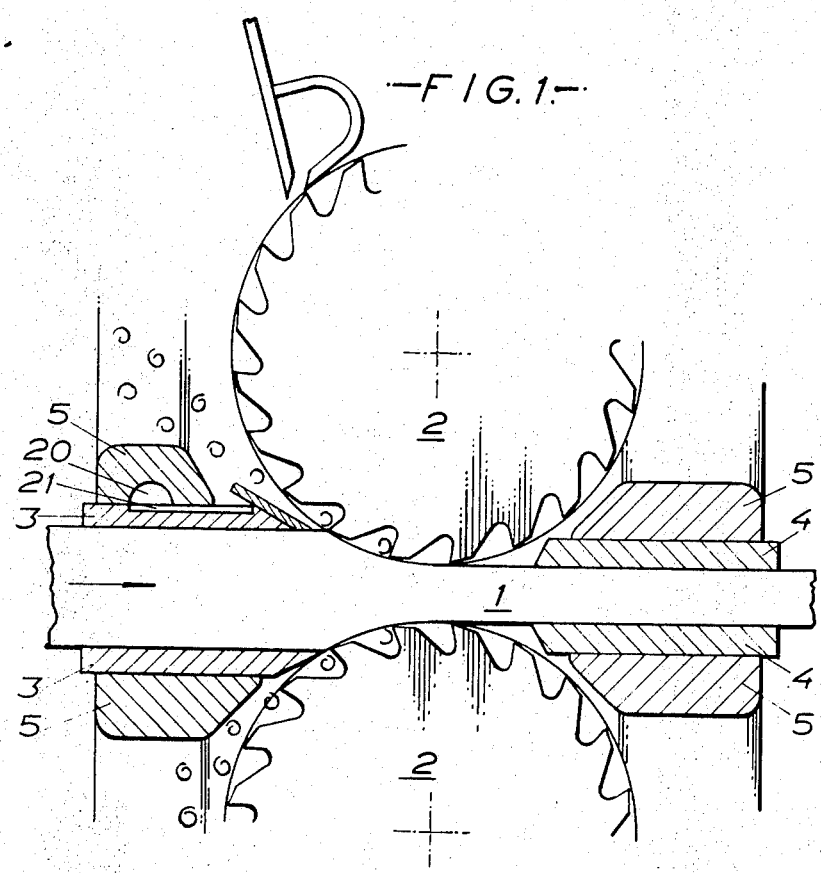

United States Patent

[11] 3,538,812

| [72] | Inventors | Jean Morel<br>Gerard Durand-Texte, Paris, France; Josef Froehling, Heinz Dittmann,<br>Olpe, Germany |
|---|---|---|
| [21] | Appl. No. | 695,929 |
| [22] | Filed | Jan. 5, 1968 |
| [45] | Patented | Nov. 10, 1970 |
| [73] | Assignee | Josef Froehling doing business as Firma Josef Froehling, Westphalia, Germany a Sole Proprietorship of Germany |
| [32] | Priority | Sept. 25, 1967, Jan. 9, 1967 |
| [33] | | Germany |
| [31] | | F 53,585 and F 51,206 |

[54] MILLING MACHINES
11 Claims, 8 Drawing Figs.

[52] U.S. Cl. .................................................. 90/16,
90/11, 90/21
[51] Int. Cl. ...................................................... B23c 1/12,
B23c 9/00
[50] Field of Search ............................................ 90/11, 21,
16, 21.5, 164; 144/116; 51/80(A), 82, 87; 143/40

[56] References Cited
UNITED STATES PATENTS

| 132,663 | 10/1872 | Hoyt et al. .................... | 144/116 |
| 526,903 | 10/1894 | Jenkins........................ | 144/116 |
| 1,360,001 | 11/1920 | Mathias........................ | 90/16 |
| 2,102,186 | 12/1937 | Nicholson et al. ............ | 144/116 |
| 3,125,141 | 3/1964 | Best et al. .................... | 144/116X |
| 3,322,037 | 5/1967 | Cavagnero .................... | 90/11 |

*Primary Examiner*—Gil Weidenfeld
*Attorney*—Burns, Doane, Benedict, Swecker & Mathis ABSTRACT: A milling machine having opposed rotary cutters for milling both sides of an elongated work piece simultaneously as the work piece passes through the machine. Guides are provided before and after the cutters which extend in close proximity to the cutting region, to grip the workpiece on either side of the cutters to prevent unwanted movement of the workpiece during milling. By incorporating suitably shaped cutters and guides and suitable workpiece feeding means, workpieces of other than flat cross section can be accommodated by the machine.

Patented Nov. 10, 1970
3,538,812
Sheet 4 of 4
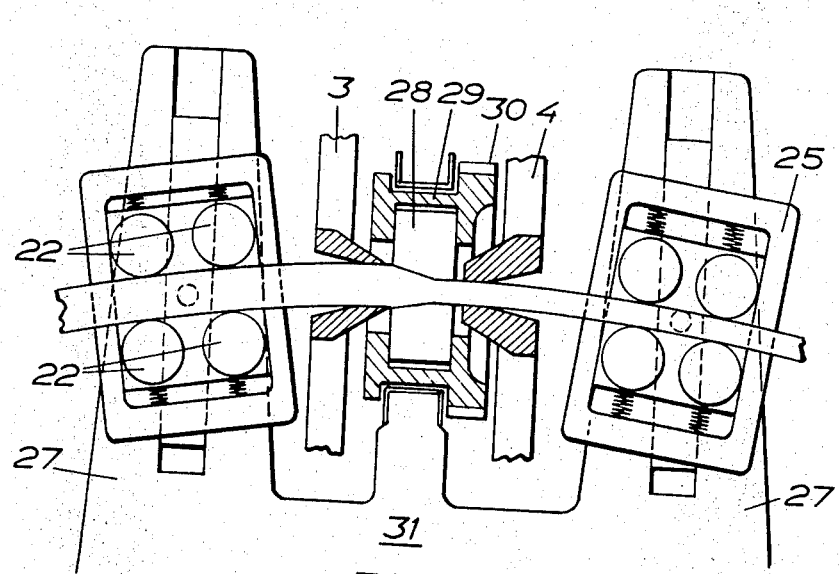
—FIG. 6.—
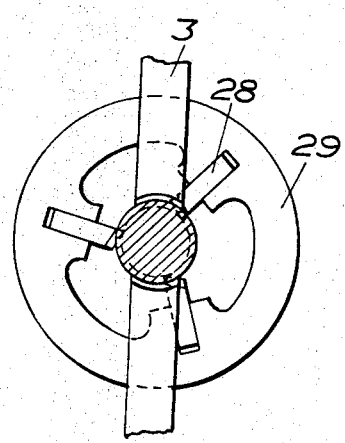
—FIG. 7.—
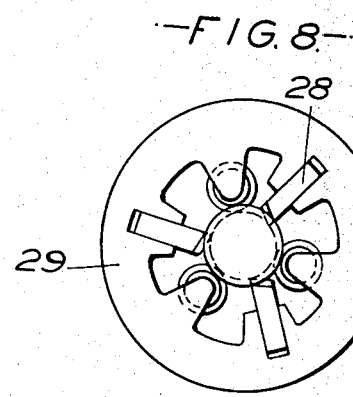
—FIG. 8.—

MILLING MACHINES

The present invention concerns milling machines for the milling of elongated workpieces.

The milling machine generally used today for the machining of sheet bars or similar elongated workpieces is the unilaterally acting type where only one side is milled in each pass. In such a machine the workpiece is guided and advanced by driven pairs of rollers facing one another and situated before and after the cutter. Directly opposite the cutter is a counterpressure roller.

This known device does however present substantial drawbacks. To achieve maximum cutting speeds, the workpiece must be conducted in the immediate vicinity of the cutter in such a way that it cannot deviate, either in the direction of the cutter or in the opposite direction, and that it is held free of oscillations. However this is virtually impossible in practice, since the diameter of the driven rollers alone necessarily makes for a certain minimum distance between the guiding roller pairs and the rotating cutter and in practice this minimum distance has to be exceeded as a rule, so that the millings produced during the work do not get in between the rollers and the workpiece which would result in their being rolled into the material by subsequent rollers.

The previous, unilaterally acting milling machine has the further drawback in that it requires a high expenditure in labour and time because the workpiece, once it has been milled on one side, has to be turned round and guided again through the machine so that the other side can be milled. It is possible theoretically to provide the machine with a double cutter, that is with a second cutter instead of the abovementioned counterpressure roller, and to machine the workpiece in one pass simultaneously on the upper and the lower sides, but in practice the aforementioned difficulties are experienced to a much greater degree. Furthermore the simultaneous cutting of the upper and lower sides of the workpiece causes vibration to occur in the machine, which renders impossible the milling of smooth, clean surfaces and which can lead to the breaking of teeth from the cutters since an accurate holding of the workpiece during milling can no longer be guaranteed.

Equipment for double-sided milling is known where two unilaterally acting milling machines are arranged one behind the other in such a way that the first machine mills the lower side, whilst the second machine, arranged the other way up, mills the upper side of the workpiece as it passes through. However these machines present the abovementioned drawbacks and are approximately twice as expensive as a single-sided machine.

It is an object of the present invention to overcome not only the previous drawbacks inherent in unilateral milling machines, but beyond this to produce a machine which allows for clean and perfect milling on both sides of elongated workpieces such as sheet bars by means of two cutters, not only in a single working feed but also in a single machine.

According to the present invention a milling machine which includes material feeding means for feeding an elongated workpiece through the machine comprises two cutters situated opposite one another to mill simultaneously both sides of the workpiece and guides between the cutting and feeding devices which are at substantially the same level as the cutters and are supported transversely above and below the path of the workpiece, the guides extending close to the cutters both on the inlet and outlet sides thereof and presenting surfaces over which the workpiece can slide.

The portion of the guides in contact with the workpiece is preferably of reduced width and contacts the workpiece only in the immediate vicinity of the plane of the cutter. Such an arrangement thereby permits the milling of curved bars of flat cross section.

The invention is not limited to workpieces of flat cross section but may also be applied to the milling of workpieces of any cross-sectional shape such as square or triangular or circular. To this end guides and cutters may be arranged with equal angular spacing around the longitudinal axis of the workpiece.

Figure 2:
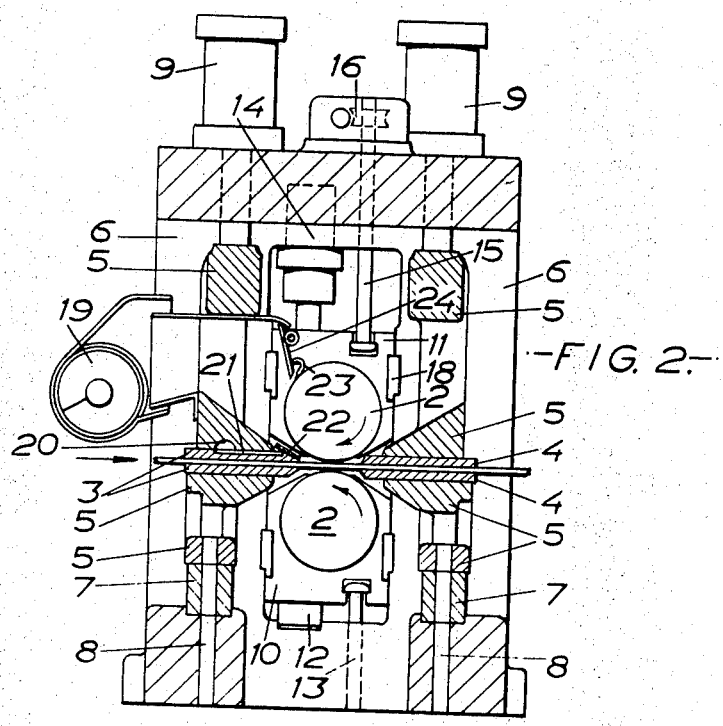
Figure 3:
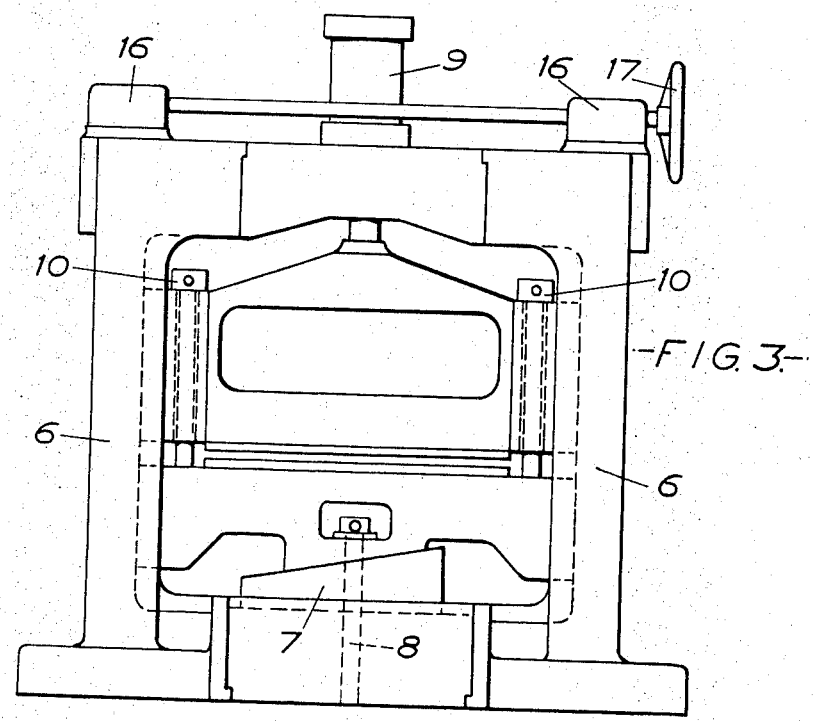
Figure 4:
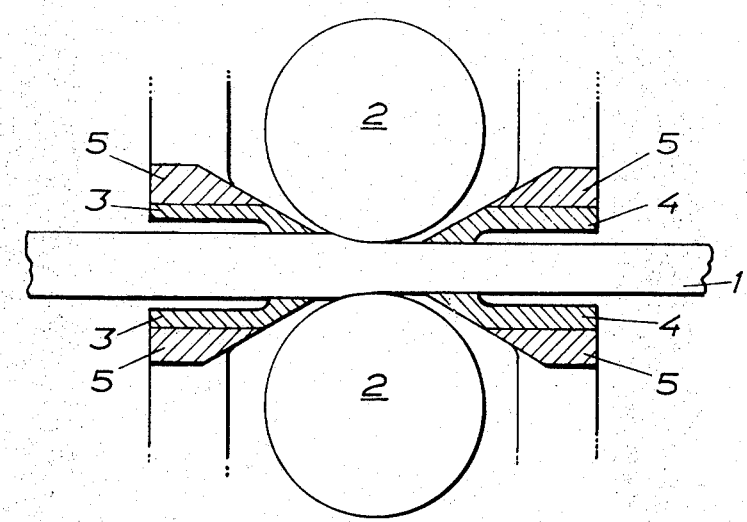
Figure 5:
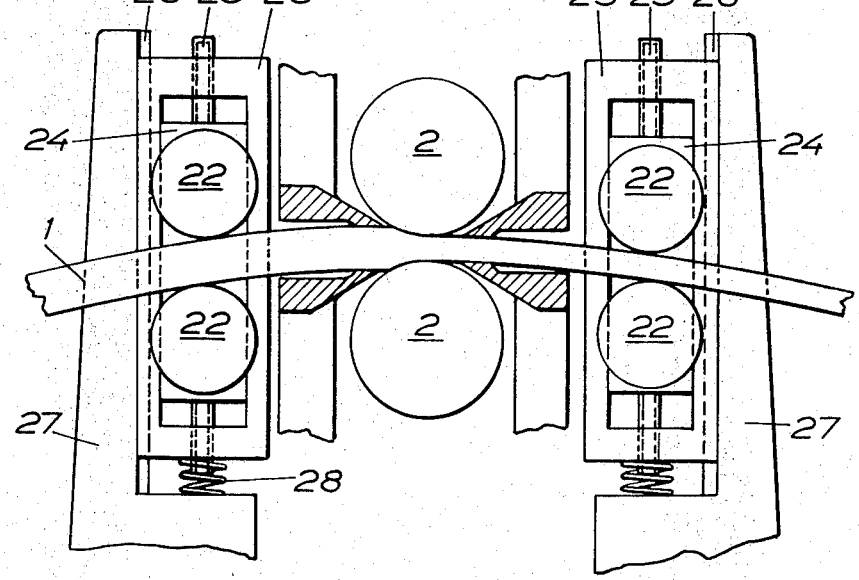

The invention will now be described by way of example with reference to the accompanying drawings in which:

FIG. 1 illustrates partly in section, the cutters and guides of a milling machine which embodies the invention, FIG. 2 is a side elevation in vertical section of a milling machine employing the cutters and guides of FIG. 1, FIG. 3 is an end view of the machine of FIG. 2, FIG. 4 illustrates partly in section, the cutter and guides for a milling machine adapted to receive curved workpieces of flat cross section, FIG. 5 is a side elevation of part of a machine employing the cutters and guides of FIG. 4, FIG. 6 illustrates somewhat diagrammatically a machine for milling workpieces of round cross section in which the cutters are replaced by paring knives, FIG. 7 illustrates a cutter head for the machine of FIG. 6, and FIG. 8 illustrates a cutter head similar to that of FIG. 7 which includes rotatable guides in place of fixed guides.

In FIG. 1 a sheet bar 1 to be milled, and which constitutes the workpiece, is moved in the direction of the arrow by feeding devices (not shown in the drawing), to a rotary cutter 2, and is guided by guide bars 3 and 4 on the inlet side and outlet side respectively, these guide bars being attached in turn to the guide units 5. The guide bars 3 and 4 extend so close to the cutter that a guiding of the sheet bar absolutely free of oscillations during the milling is guaranteed. The unguided length of the sheet bar is kept very short in accordance with the invention.

The cut millings which are thrown over the edges of the guide bars 3 and the guide units 5 may be removed by suitable devices (not shown) for example by suction. The edge of the guide bar 3 on the inlet side, which is designed to have an acute angle, ensures a smooth removal of the cut millings. The edges of the guide bars 4 on the outlet are, facing the rotary cutters, ensure a stripping of any flyover millings, so that no millings can get in between the sheet bar and the guiding devices. The type of the feeding devices for the sheet bar is not critical in the milling machine in accordance with the invention. It is possible for example to use feed rollers, but any other type of advancing movement may be used and a straightening machine having a feed mechanism might be arranged in series with the milling machine or a feed employing a tongue or claw type of drive may be used.

FIG. 2 shows a milling machine which employs the cutters and guides of FIG. 1 while FIG. 3 is an elevation of the same machine when viewed from the inlet end of the machine.

Where applicable the same reference numbers have been used in FIGS. 2 and 3.

Referring now to the machine illustrated in FIGS. 2 and 3, the guide pieces 5 which in turn hold the guide bars 3 and 4 are located in bearings in stands 6 and are adjustable mechanically on the inlet side to the inlet thickness and on the outlet side to the outlet thickness of the workpiece. In the machine illustrated adjustment of the bottom guides is by means of wedges 7, the guide pieces being fixed in position by screw jacks or rams 8, while the top guide pieces are pressed down by means of cylinders 9 and are supported by way of adjustable support members on the bottom guides.

The distance between the guide bars 3 and 4 may be set accurately to the thickness dimension of the workpiece or to a dimension that is smaller than the workpiece thickness. In the latter case the pressure exerted by the cylinders 9 is sufficient to guide the workpiece as it passes through. The close spacing of the two guides on the inlet side prevents the simultaneous entry of two workpieces on top of one another.

The invention further provides that the support member 10 and 11 of the cutters 2 are located and tensioned in such a way that no play can occur in the guides within the stands 6. In this machine this tensioning is achieved for the bottom support member 10 by a wedge 12 which is tightened by screw means 13. Alternatively ram means may be employed.

For the top support pieces 11, rams 14 are provided which press the support pieces against a spindle 15 the height of which can be adjusted with a handwheel 17 by way of a worm gear 16 to set the milling gap.

The setting devices 12, 14, together with the tensioning devices 13, 15 tension the support members 10, 11 in their guides in such a way that the cutters rotate free of oscillations and the use of metal and diamond or ceramic tools is possible.

The provision of an hydraulic ram 14 at least for the top support member 11 allows the latter to move upwards in the event of overloading of the cutter, which results in an increase in pressure in the ram.

In the stand 6 and in the support pieces 10 and 11 recesses 18 are provided, into which bars can be introduced on which the support pieces 10 and 11 can be slid, to permit dismantling of the cutters.

A recess is provided in the top guide piece 5 for the removal of the milling which are thrown by the top cutter 2 towards the inlet. The centrifugal effect of the cutter may be assisted by a suction device mounted in the region of the millings collecting channel 19.

In the machine illustrated, the millings removal is assisted by an air stream which is conducted from the top guide 5 through the bore 20, through grooves 21 in the top guide bar 3 and through baffle plates 22 into the direction of flight of the millings. A further air stream is introduced through the half-dish 23 on the adjustable millings baffle 24. This air stream may be mixed with a lubricant and coolant or with cutting oil or emulsion which lubricates the cutting edges of the cutter and, depending on the direction of the flow jets can be applied directly from the semidish 23 in a straight stream to the cutter edges.

A similar arrangement can be applied to the bottom cutter.

The particular design of the guiding devices, guide bars 3, 4 and guide pieces 5, makes it possible to bring these much closer to the cutters than had been possible with the previously used guide rollers, and consequently to achieve a safe guidance of the workpiece which is to be milled with application of higher cutting speeds than hitherto. The minimum distance between guides and rotary cutter is determined basically by the type and size of millings.

One of the essential advantages of the presently described milling machines lies in the fact that it can be fitted with a double cutter without any of the aforementioned drawbacks associated with previous milling machines arising. By means of the present milling machine it is therefore possible for the first time to machine simultaneously on both sides sheet bars or other elongated workpieces in a single machine pass and yet still achieve smooth and clean milled surfaces at high cutting speeds. This is somewhat unexpected since the vibrations produced by the cutters, cutting into the workpiece, do not appear to be less than in milling machines of previous design.

In FIG. 4 a modified form of guide is shown in which the guides 3, 4 are in contact with the material to be milled over only a portion of their length in the immediate vicinity of the periphery of the cutter. This type of embodiment not only allows the milling of sheet bars, but also that of curved workpieces of flat cross section.

In FIG. 5 a machine employing the guides of FIG. 4, is shown in which the cutters 2 are in operating position for the machining of material 1. The latter is passed through the guide bars 3, 4, the guide bars in turn being fastened to the adjustable guide pieces 5. FIG. 5 shows that the guide bars 3, 4 are recessed so that they are in sliding contact with the material to be machined only directly before and behind the cutter.

FIG. 5 demonstrates the extent to which the workpiece 1 can be curved. The feed of the material is provided by driven rollers 22 which by way of the spindle 23 or elastic members, such as springs, pneumatic or hydraulic rams (not shown) are pressed down on to the workpiece. The rollers 22 have their support pieces 24 in the stands 25. The stands 25 in turn are arranged so that they can be moved upwards and downwards in the guides 26. The stands 25 are guided along the machine stands 27 and are supported by springs 28. Through this arrangement the level of the stands 25 is adaptable to the natural curvature of the material 1.

The milling machine can also cope with workpieces of other than flat cross section. In this case the feeding devices, guides and cutters are adapted in their shape to the particular cross section.

For example, for the milling of material of circular cross section the material may be fed by three feed devices circularly spaced around the material at regular intervals and radially directed towards the material axis. Similarly arranged guides and cutters may be provided and in such an arrangement the cutters can be in the form of cutter heads with paring knives.

FIG. 6 shows a machine for milling material of round cross section in which the feeding devices and guides are similar to the corresponding devices shown in FIG. 5 but the cutters are replaced by a rotary inserted blade milling cutter 29 with paring knives 28. The rotary inserted blade milling cutter 29 is supported in the machine stand 31 and is driven by a gear wheel 30. The inserted blade milling cutter 29 rotates around the longitudinal axis of the material to be machined, this material being advanced at the same time by means of driven rollers 22. The strands 25 of the rollers 22 are arranged in the machine stands 27 so that they can pivot upwards and downwards and in this way adapt themselves to the natural curvature of the material as it passes through the machine.

FIG. 7 shows in partial cross section, cutting device of FIG. 6 and shows the relative positions of the guides 3, the paring knives 28 and the inserted blade cutter 29. The guide 3 and the guide 4 (not shown in FIG. 7) are fixed and are in sliding contact with the material passing through the machine. The guide 3 (FIG. 7) consists of two parts facing one another. It is also possible however for the guide to consist of more than two parts, e.g. it may comprise three sections which surround the material and are regularly spaced therearound. Likewise the number of paring knives can be increased.

Instead of fixed guides, guides may be inserted in the rotary cutter head (as shown in FIG. 8) which revolve together with the cutter head. Such guides preferably comprise rollers which are arranged to rotate about axes parallel to the longitudinal axis of the workpiece or about axes which are inclined by a small angle to the longitudinal axis of the workpiece.

We claim:

1. A milling machine for milling at least two sides of an elongated, longitudinally advancing, generally homogeneous workpiece which machine comprises a rotating cutter means for each side to be milled, means for advancing said workpiece past said cutter means, the axis of each of said cutter means being arranged in a common plane which is perpendicular to the forward motion of the workpiece for the simultaneous milling thereof, said workpiece being guided by a pair of guide means for each side to be milled, both pair of said guide means having planar surfaces for intimate sliding surface contact with the surfaces of the workpiece, one of said guide means of each pair being located ahead of and the other guide means of the same pair being located after the cutting means with which said pair of guide means is adapted to cooperate, each of said guide means extending close the working zone of the pertinent cutter means.

2. A milling machine according to claim 1 comprising means for adjusting the height of said guide means.

3. A milling machine according to claim 1 which comprises adjustable pressure loading means making at least one of said guide means yieldably movable in the event of an overload.

4. A milling machine according to claim 1 wherein the guide means are shaped and set so as to prevent the unintentional simultaneous entry of two workpieces into the machine.

5. A milling machine according to claim 3 wherein support members for the cutter means are provided which support members are adapted to be tensioned in their guide means such that no play can occur and wherein said guide means are adapted to yield in the event of cutter means overload.

6. A milling machine according to claim 1 wherein at least the upper guide means comprises a windowlike recess in the direction of flight of the millings ejected from the cutter means.

7. A milling machine according to claim 6 comprising openings at the end of the guide means located in front of the cutter means adapted to jet a gas stream in the direction of flight of the millings so as to assist in the removal thereof.

8. A milling machine according to claim 1 comprising jet means for directing a coolant and lubricant carrying stream to the edges of the cutter means adapted to remove millings adhering thereto.

9. A milling machine according to claim 1 which further comprises blade means on the guide means on the outlet side of the machine adapted to wipe millings from the cutter edge.

10. A milling machine according to claim 1 characterized in that the portion of the guide means which is adapted for gliding contact with the workpiece is of such narrow width that it is in touch with the workpiece only in the immediate vicinity of the periphery of the cutter means.

11. A milling machine according to claim 1 wherein said advancing means are vertically and laterally movable.